United States Patent Office 3,014,964
Patented Dec. 26, 1961

3,014,964
PROCESS FOR PREPARING 1-HALO-SUBSTITUTED COMPOUNDS OF PENTAVALENT PHOSPHORUS
John L. Van Winkle, San Lorenzo, Calif., assignor to Shell Oil Company, a corporation of Delaware
No Drawing. Filed May 13, 1957, Ser. No. 658,544
4 Claims. (Cl. 260—543)

This invention relates to an improved process for effecting the reaction of a carbonyl compound and halides of trivalent phosphorus to form 1-halo-substituted compounds of pentavalent phosphorus.

It has recently been discovered that certain of the amine salts of 1-haloalkyl-phosphonic acids impart outstanding extreme pressure and load carrying properties to lubricant compositions in which they are incorporated. Further, these amine salts are quite soluble in oil and do not corrode or stain metals with which they come into contact. These amine salts of 1-haloalkylphosphonic acids thus are promising extreme pressure agents for lubricant compositions.

The amine salts of 1-haloalkylphosphonic acids normally are prepared by simply mixing the acid and the amine. There is, therefore, substantial interest in simple and efficient methods for producing 1-haloalkylphosphonic acids cheaply. The simplest and least costly method for preparing these acids disclosed in the art is that of Kabachnik and Shepeleva, reported by them in Izvest. Akad. Nauk S.S.S.R., Otdel. Khim. Nauk, 1950, 39–46 and 1951, 185–91, and in Doklady Akad. Nauk S.S.S.R., 75, 219–22 (1950). According to these workers, 1-halophosphonic acids are prepared by hydrolysis (by water) of 1-halophosphonic dihalides which are formed by reacting a carbonyl compound with a halide of trivalent phosphorus, in a mole ratio of about 1:1.5, for 3–6 hours at a temperature of from about 160° C. to about 250° C. However, the best yield reported by these workers was 67%, with most of the yields reported being much lower than this. These yields were confirmed by later workers (Crofts and Kosolapoff, J. Am. Chem. Soc., 75, 5738–40 (1953)) and by me.

I have now discovered that substantially higher yields of the desired products than can be obtained by this prior art process are obtained by conducting the reaction of the carbonyl compound and the halide of trivalent phosphorus in the presence of an added hydrogen halide. Thus, when paraformaldehyde is reacted with phosphorus trichloride non-catalytically according to the prior art process, the maximum yield of 1-chloromethylphosphonic dichloride obtained is about 67%, based on the amount of paraformaldehyde consumed. By conducting the reaction in the presence of added hydrogen halide (for example, hydrogen chloride), the usual yield of 1-chloromethylphosphonic dichloride is of the order of about 80–85%, based on the paraformaldehyde consumed, or about 25% better than the maximum obtained by the prior art process. Again, when paraldehyde is reacted with phosphorus trichloride in the presence of added hydrogen chloride, the yield of 1-chloroethylphosphonic dichloride is of the order of about 30%, or nearly double the 16% yield reported to have been obtained by the prior art process.

My discovery thus provides a markedly improved process for conducting the reaction of carbonyl compounds with halides of trivalent phosphorus to form 1-halo-derivatives of pentavalent phosphorus.

As is pointed out by Kabachnik and Shepeleva, the reaction between a carbonyl compound (an aldehyde or ketone) and a halide of trivalent phosphorus, is a general one, involving reaction according to the equation,

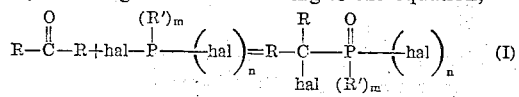

(I)

wherein hal is halogen, R is hydrogen or an organic radical, R' is hydrogen or an organic radical and $n$ is 0, 1 or 2, with the proviso that $m+n=2$.

Thus, by this process, three general classes of 1-halo-derivatives of pentavalent phosphorus can be prepared: (a) 1-halophosphonic dihalides (from phosphorus trihalides); (b) 1-halophosphinic halides (from organo-phosphorus dihalides) and (c) 1-halophosphine oxides (from diorgano-phosphorus monohalides).

Suitable as the carbonyl compound is any compound which has as its primary reactive component the structure >C=O. Thus, any aldehyde or ketone is suitable. However, the unsubstituted carbonyl compounds—that is, the aldehydes and ketones represented by the formula (I) wherein R represents a hydrocarbon group—are particularly suited to the process of the invention. Preferably, these hydrocarbon groups are free from olefinic and acetylinic unsaturation. Typical examples of this class of carbonyl compounds include the aromatic aldehydes and ketones, such as benzaldehyde, diphenyl ketone (benzophenone), alpha- and beta-hydrindones, and alpha-tetralone, the aralkyl aldehydes and ketones such as phenylacetaldehyde, 3-phenylpropionaldehyde, dibenzyl ketone, di(phenethyl) ketone and the like, the alkaryl aldehydes and ketones, such as p-methylbenzaldehyde, 3,5-dimethylbenzaldehyde, di(p-ethylphenyl) ketone and the like, aliphatic aldehydes and ketones, including cycloaliphatic aldehydes and ketones, such as formaldehyde (as such or in the form of paraformaldehyde or trioxane), acetaldehyde (as such or in the form of paraldehyde), propionaldehyde, n- and isobutyraldehyde, n- and iso-valeraldehyde, n-caproaldehyde, n-heptaldehyde (enanthol), acetone, methyl ethyl ketone, methyl butyl ketone, di-isopropyl ketone, methyl nonyl ketone, cyclohexanone, cyclopentanone, dicyclohexyl ketone, cyclohexylacetaldehyde, methyl cyclohexyl ketone, and the like, and mixed ketones, such as methyl phenyl ketone, methyl cyclohexyl ketone, and the like. Because of the utility of the resulting derivatives, it is preferred that the carbonyl compound be an unsubstituted aldehyde containing from 1 to about 20 carbon atoms, the unsubstituted alkanals—that is, straight-chain, branched-chain and cyclo-alkyl aldehydes—containing up to about 10 carbon atoms being of particular interest. Where a ketone is used as the starting material, preferably each of the organic groups thereof is an unsubstituted hydrocarbon group containing from 1 to about 10 carbon atoms; preferably each of these hydrocarbon groups is an alkyl group, including straight-chain, branched-chain and cyclo-alkyl configurations.

Suitable as the halide of trivalent phosphorus is any halide of trivalent phosphorus wherein the halogen atom(s) is(are) middle halogen—that is, bromine or chlorine. As set out hereinbefore, the halide of trivalent phosphorus is represented by the formula $$\text{hal}-\underset{\underset{n}{|}}{\overset{(R')_m}{P}}-(\text{hal})_n$$

wherein "hal" represents a middle halogen atom, "R'" represents a hydrogen atom or an organic group and $n$ is 0, 1 or 2, with the proviso that $m+n=2$. Where it is desired to prepare a 1-halophosphonic acid, $n$ is 2 and $m$ is 0, the product being the 1-halophosphonic dihalide. Where it is desired to prepare a 1-halo-(secondary phosphonic) acid (i.e., 1-halophosphinic acid), $n$ is 1 and $m$ is 1, the product being the 1-halophosphonic monohalide. Where it is desired to prepare a 1-halophosphine oxide, $n$ is 0 and $m$ is 2. Where the halide of trivalent phosphorus is an organo-phosphorus dihalide $(R'-P-(-\text{hal})_2)$ or a di-organo-phosphorus halide $(R')_2-P-\text{hal})$, the organic group or groups (represented by R') may be of any type, free from olefinic and acetylenic unsaturation, and including aliphatic (which term includes branched-chain, straight-chain, and cyclic aliphatic) groups, aromatic, araliphatic or aliphatic-substituted aromatic. It is preferred that the organic group represented by R' be an unsubstituted hydrocarbon group, and preferably containing from 1 to about 20 carbon atoms. Still more preferably, the organic group is an alkyl group (including straight-chain, branched-chain and cycloalkyl groups), containing from 1 to about 10 carbon atoms. Suitable halides of trivalent phosphorus thus include phosphorous trichloride, phosphorous tribromide, bromodichlorophosphine, chlorodibromophosphine, dimethylphsphinous chloride, diethylphosphinous bromide, ethyl(isopropyl)phosphinous chloride, dinonylphosphinous bromide, diamylphosphinous chloride, methyl(phenyl)phosphinous bromide, diphenylphosphinous chloride, ethyl(benzyl)phosphinous chloride, dicyclohexylphosphinous bromide, methyl(tolyl)phosphinous bromide, methylphosphonous dichloride, methyl(chloro)(bromo)phosphine, ethylphosphonous dibromide, isopropylphosphonous dichloride, hexyl(chloro)(bromo)phosphine, nonylphosphonous dibromide, phenylphosphonous dibromide, benzylphosphonous dichloride, cyclohexylphosphonous dibromide, tolylphosphonous dibromide, and the like.

As is pointed out by Kabachnik and Shepeleva, it is essential to the production of 1-halo-derivatives of pentavalent phosphorus as the product that the halide of trivalent phosphorus be present in the reaction zone in excess (on a molar basis) of the carbonyl compound. In accord with the art, I have found that maximum yields of the desired product are obtained when the reaction mixture contains about 1.5 moles (that is, from about 1.25 to about 2.0 moles) of the halide of trivalent phosphorus per mole of carbonyl compound charged. It is essential to the high yields of the 1-halo-derivatives of pentavalent phosphorus possible by my improved process that at least about 1.25 moles of the halide of trivalent phosphorus be present per mole of the carbonyl compound. Molar excesses of the phosphorus halide over the carbonyl compound greater than about 2.0:1 result in slight reduction of the yield of the 1-halo-derivative product. Consequently, it is desirable that the mole ratio of phosphorus halide-to-carbonyl compound not exceed about 2.5:1.

Suitable as the added hydrogen halide is either or both of hydrogen chloride and hydrogen bromide. The added hydrogen halide thus may generically be termed a hydrogen halide of a middle halogen.

The amount of hydrogen halide added is critical. Thus, it has been found that at least about 0.01 mole of the hydrogen halide per mole of carbonyl compound must be present, and preferably, at least 0.02 mole of hydrogen halide are charged per mole of carbonyl compound. Any amount of the hydrogen halide above this minimum may be used; in general, the yield of the 1-halo-derivative of pentavalent phosphorus increases gradually as the concentration of hydrogen halide increases. However, it will be found that concentrations of hydrogen halide greater than about 1.0 mole of hydrogen halide per mole of carbonyl compound will not be of substantial advantage over somewhat lesser concentrations. Preferably, from about 0.02 to about 0.5 mole of hydrogen halide are charged per mole of carbonyl compound.

The reaction between the carbonyl compound and the phosphorus halide is effected by mixing the two reactants, and the added hydrogen halide, and heating the agitated mixture at a moderately elevated temperature for a sufficient period of time to permit completion of the desired reaction. The manner of conducting the reaction is clearly shown by Kabachnik and Shepeleva.

In general, it is desirable that the carbonyl compound be added, with constant stirring, to the phosphorus halide, thus insuring that an excess of the halide will be present at all times.

The reactants should be anhydrous, and precautions must be taken to maintain the reaction zone in substantially anhydrous condition throughout the conduct of the reaction.

Molecular oxygen should be excluded from the reaction zone—if necessary, by conducting the reaction in the presence of an inert atmosphere, such as nitrogen, or carbon dioxide.

The reaction of the carbonyl compound and the phosphorus halide generally goes forward at reasonable rates only at temperatures above about 150° C.; however, it seldom will be found necessary to exceed a reaction temperature of about 300° C. It usually will be found that the extent of the desired reaction will be somewhat dependent upon the temperature, with maximum yields obtained at a particular temperature, and lower yields at temperatures above and below that temperature. Thus, in the case where a phosphorus trihalide and a lower aliphatic aldehyde such as paraformaldehyde are reacted, it will be found that optimum yields of the 1-haloaliphaticphosphonic dihalide product are obtained at temperatures of about 250° C., with substantially lesser yields being obtained at temperatures of even 25° C. above or below that temperature. In other particular cases, the optimum reaction temperature will be different, but within the stated temperature ranges.

The reaction can be carried out at any pressure. Normally, it will be found most convenient to charge the reactants and the added hydrogen halide to a vessel, add hydrogen halide as necessary to provide the necessary hydrogen halide concentration, the pressure depending upon the amount of hydrogen halide required, and then conduct the reaction under autogenous pressure.

The reaction normally will be complete in about 3 to about 6 hours; however, in some cases, the reaction may go substantially to completion in as short a time as 20 minutes, or as many as 10 hours or more may be required.

It always is necessary that there be a substantial liquid phase present in the reaction zone; in many, if not most cases, where the halide of phosphorus is liquid, the use of the prescribed amount of the halide will provide the necessary liquid in the reaction zone. In cases where the halide of phosphorus is not a liquid, or where the prescribed amount of the halide does not provide the necessary amount of liquid in the reaction zone, it may be necessary to add an inert diluent to the reaction mixture. It is essential that the diluent used be substantially inert with respect to the reactants, the added hydrogen halide and the reaction products, under the reaction conditions encountered. Suitable solvents include the halogenated alkanes, such as methylene chloride, carbon tetrachloride, or the like, or the normally liquid alkanes, such as hexane, heptane or the like.

The 1-halo-derivative of pentavalent phosphorus product may be obtained from the reaction mixture by the usual means known to the art. Conveniently, the reaction mixture is distilled to strip off the hydrogen halide and the halide of trivalent phosphorus used as initial product, and the bottoms product of this distillation is further distilled to recover the 1-halo-derivative product. Alternatively, the stripped reaction mixture may be treated with a selective solvent for the product. Where the product is a 1-halophosphonic dihalide or a 1-halophosphonic monohalide, and it is desired to prepare the corresponding dibasic or monobasic acid, respectively, substantially increased yields of these acids may be obtained by the method disclosed in copending application Serial No. 658,503, filed May 13, 1957, now U.S. Patent No. 2,874,184, granted February 17, 1959, that is by stripping the hydrogen halide and unreacted halide of trivalent phosphorus from the crude reaction mixture, hydrolyzing the stripped mixture with water, and recovering the product acid by distillation, extraction or other means.

This constitutes a general description of the process which embodies my discovery. The following examples illustrate particular embodiments of that process. These examples are included only for the purpose of illustrating my discovery, and are not intended to limit the process which embodies that discovery in any manner not recited in the claims. In these examples, the term "parts" means parts by weight, unless specifically states otherwise.

Example I 205.5 parts of phosphorus trichloride were charged to a stainless steel pressure vessel. 30 parts of paraformaldehyde were then charged to the vessel. 6 parts of anhydrous hydrogen chloride were charged to the vessel. The molar ratio of phosphorus trichloride, formaldehyde and hydrogen chloride was: 1.5:1.0:0.18. The initial pressure was 200 pounds per square inch gauge. The vessel then was placed in a shaker and with continuous shaking was heated at 250° C. for 3.25 hours. The pressure within the vessel ranged from 615 to 690 pounds per square inch gauge. At the end of the heating period, the vessel was immediately cooled and the contents were Claisen distilled. There was recovered 134 parts of a colorless liquid boiling at 40–41° C. at 1 millimeter mercury pressure. The product analyzed as follows: percent by weight of carbon: 7.5 (theory [1]: 7.2); percent by weight of hydrogen: 1.3 (theory [1]: 1.2); percent by weight of phosphorus: 18.5 (theory [1]: 18.6); percent by weight chlorine: 63.8 (theory [1]: 63.6). The product had a refractive index ($n_D^{20}$) of 1.4990. The product thus was chloromethylphosphonic dichloride. Yield: 84.4% based on the formaldehyde consumed.

The increased yields of the 1-halo-derivative product obtained according to my discovery, as compared to the yields obtained by the prior art non-catalytic process, are clearly evident from the fact that when the experiment of Example I was repeated without the added hydrogen chloride, the yield of chloromethylphosphonic dichloride was but 46.3% based on the formaldehyde consumed, or but 55% of the yield obtained according to my discovered catalytic process.

Example II

Phosphorus trichloride and paraformaldehyde were reacted in the presence of hydrogen chloride in the manner set out in Example I, the mole ratio of these compounds being: 1.5:0.95:0.55. The reaction temperature was 250° C.; the reaction time was 6 hours. The pressure at the maximum temperature encountered was 1330 pounds per square inch gauge. The yield of chloromethylphosphonic dichloride, identified by its elemental analysis, boiling point and refractive index, was 88.2%, based on the amount of formaldehyde consumed.

Example III

Repetition of the experiment reported in Example II, substituting an equivalent amount of hydrogen bromide for the hydrogen chloride results in a similar yield of the chloromethylphosphonic dichloride.

Example IV

Repetition of the experiment reported in Example II, substituting an equivalent amount of phosphorus tribromide for the phosphorus trichloride results in a similar yield of bromomethylphosphonic dibromide.

Example V

Phosphorus trichloride and paraldehyde were reacted in the presence of hydrogen chloride in the manner set out in Example I. The mole ratio of these compounds was: 1.5:0.33:0.17. The reaction temperature was 245° C.; the reaction time was 3.2 hours. The pressure at maximum temperature was 1450 pounds per square inch gauge. The product was 1-chloroethylphosphonic dichloride in 30.6% yield, based on the paraldehyde consumed,

[1] (Based on $CH_2POCl_3$).

and was identified by its elemental analysis, refractive index and boiling point. Analysis of the product showed:

|  | Percent by weight | |
| --- | --- | --- |
| carbon | 11.0 | [1] 13.3 |
| hydrogen | 1.8 | [1] 2.2 |
| phosphorus | 17.5 | [1] 17.1 |
| chlorine | 58.6 | [1] 58.7 |

[1] Theoretical ($C_2H_4PCl_3O$)

Example VI

Repetition of the experiment reported in Example II, substituting an equivalent amount of ethylphosphonous dibromide for the phosphorus trichloride results in a substantial yield of bromomethyl(ethyl)phosphonic bromide.

Example VII

Repetition of the experiment reported in Example II, substituting an equivalent amount of diethylphosphinous chloride for the phosphorus trichloride and an equivalent amount of hydrogen bromide for the hydrogen chloride results in a substantial yield of 1-chloromethyl diethyl phosphine oxide.

I claim as my invention:

1. In a process for preparing a 1-haloalkylphosphonic dihalide by the reaction of an unsubstituted alkanal with a molar excess of a phosphorus trihalide of the group consisting of phosphorus trichloride and phosphorus tribromide at a temperature above about 150° C. under substantially anhydrous conditions and in the substantial absence of molecular oxygen, the improvement of adding to the reaction mixture sufficient hydrogen halide, of the class consisting of hydrogen chloride and hydrogen bromide, to provide in the initial reaction mixture from 0.02 to 1.0 mole of said hydrogen halide per mole of said alkanal.

2. In a process for preparing chloromethylphosphonic dichloride by the reaction of paraformaldehyde with a molar excess of phosphorus trichloride, at a temperature of from about 150° C. to about 300° C. under substantially anhydrous conditions and in the substantial absence of molecular oxygen, the improvement of adding sufficient hydrogen chloride to the reaction mixture to provide in the initial reaction mixture from 0.02 to 1.0 mole of hydrogen chloride per mole of paraformaldehyde.

3. In a process for preparing chloromethylphosphonic dichloride by the reaction of paraformaldehyde with a molar excess of phosphorus trichloride, at a temperature about 250° C. under substantially anhydrous conditions and in the substantial absence of molecular oxygen, the improvement of adding sufficient hydrogen chloride to the reaction mixture to provide in the initial reaction mixture from 0.02 to 1.0 mole of hydrogen chloride per mole of paraformaldehyde.

4. In a process for preparing a 1-chloroalkylphosphonic dichloride, by the reaction of an unsubstituted alkanal with a molar excess of phosphorus trichloride at a temperature above about 150° C. under substantially anhydrous conditions and in the substantial absence of molecular oxygen, the improvement of adding to the reaction mixture sufficient hydrogen chloride to provide in the initial reaction mixture from 0.02 to 1.0 mole of hydrogen chloride per mole of said alkanal.

References Cited in the file of this patent

UNITED STATES PATENTS 2,874,184 Van Winkle et al. _____ Feb. 17, 1959

OTHER REFERENCES

Kosolapoff: "Organophosphorus compounds," John Wiley and Sons, Inc., New York (1950), pages 4 and 5.

Kabachnik et al.: Chem. Abstracts, vol. 45, pages 6569 to 6570 and 10191 (1951).